(12) United States Patent
Murata

(10) Patent No.: US 6,378,006 B1
(45) Date of Patent: Apr. 23, 2002

(54) DATA PROCESSING METHOD, RECORDING MEDIUM AND DATA PROCESSING APPARATUS

(75) Inventor: Seiji Murata, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/140,043

(22) Filed: Aug. 26, 1998

(30) Foreign Application Priority Data

Aug. 29, 1997 (JP) .............................................. 9-234977

(51) Int. Cl.$^7$ ................................................ G06F 9/54
(52) U.S. Cl. ........................................ 709/321; 710/48
(58) Field of Search ................................ 709/100–108, 709/315, 316, 318, 321–327, 312; 710/6, 8, 46–51, 261

(56) References Cited

U.S. PATENT DOCUMENTS

| 5,680,624 A | * 10/1997 | Ross ........................... 710/261 |
| 5,724,503 A | * 3/1998 | Kleinman et al. .......... 709/318 |
| 5,819,107 A | * 10/1998 | Lichtman et al. .............. 710/8 |
| 5,978,857 A | * 11/1999 | Graham ....................... 709/312 |
| 6,134,627 A | * 10/2000 | Bak .............................. 711/6 |

FOREIGN PATENT DOCUMENTS

WO    WO 95/17719    6/1995    ............. G06F/9/46

OTHER PUBLICATIONS

Lemon S. et al: "On Object Oriented Device Driver Model" Digest of Papers. Compcon '95. Technologies for the Information Superhighway (Cat. No. 95CH35737), Digest of Papers. Compcon'95. Technologies for the Information Superhighway, San Francisco, CA, USA, Mar. 5–9, 1995, pp. 360–366, XP000566086 ISBN 0–8186–7029–0, 1995, Los Alamitos, CA, USA, IEEE Comput. Soc. Press, USA.

* cited by examiner

*Primary Examiner*—St. John Courtenay, III
(74) *Attorney, Agent, or Firm*—Frommer Lawrence & Haug LLP; William S. Frommer

(57) ABSTRACT

Each of object-oriented device drivers is described in terms of a multi-thread object which can allocate a message processing thread and an interrupt processing thread to be exclusively used for each interrupt. The device driver, when executing a processing based on a message received from another object, assigns the processing to the message processing thread. When an event has occurred requesting an interrupt to the device driver, the device driver executes the interrupt processing corresponding to the event in the interrupt processing thread corresponding to the event. In case that the corresponding processing thread is busy due to execution of another interrupt processing in response to an earlier interrupt when the event has occurred, the interrupt processing corresponding to the event is held without being executed regardless of the state of the message processing thread, and is executed only after completion of the interrupt processing for the earlier interrupt that is under execution in the interrupt processing thread. Interrupt latency is shortened without affecting advantages brought about by the use of the object-oriented device drivers.

12 Claims, 9 Drawing Sheets

DATA PROCESSING METHOD, RECORDING MEDIUM AND DATA PROCESSING APPARATUS

BACKGROUND OF THE INVENTION

1. Field of the Invention

The present invention relates to a data processing method that implements device control in an object-oriented operating system. The present invention also relates to a recording medium storing a program that implements the data processing method, as well as to a data processing apparatus incorporating the recording medium. Details of certain features of the present invention are described in European Patent Application No. 0.753,811 A1 entitled "Data processing method and device" and filed by the same assignee on Jul. 12, 1996 claiming a Convention Priority on JP 178625/95, filed Jul. 14, 1997, the complete disclosure of which is hereby incorporated herein by reference.

2. Description of the Related Art

In general, device drivers that are programs for controlling various hardware devices are implemented as part of an operating system, as illustrated in FIG. 8. More specifically, the operating system, in response to a request for using a certain device driver given by a client or to a hardware interrupt, retrieves a device driver table to find the target device driver complying with the request or the interrupt from among device drivers registered in the device driver table. The operating system then calls the found device driver by means of a function call and executes the called device driver.

The client's request is given by means of a system call, while the hardware interrupt is made by invoking a kernel thread of the operating system.

This known system has the following problems.

(1) Adaptability of the operating system is limited and replacement of a device driver is not easy because the device driver is implemented as part of a kernel of the operating system.

(2) Any error in a device driver affects the whole operating system because the device driver is executed with the same authority as the kernel of the operating system.

(3) Interrupt and other controls are performed on independent device drivers. The programmers who form the device drivers, therefore, are required to have knowledge of the whole system and to consider the influence of each device driver on other parts of the system.

(4) The style of programming of the device driver is significantly different from that for application programs because the device driver is implemented as part of the kernel of the operating system. Therefore, it is not easy for a programmer to form a device driver unless he is familiar with and well trained in the programming style which is used in describing device drivers.

In order to overcome these problems, a method has been known in which device drivers are described by using an object-oriented technique. When the object-oriented technique is used, the device drivers are formed as parallel objects outside the operating system, in the same way as that for application programs, as shown in FIG. 9 by way of example.

The term "parallel objects" is used in this specification to mean program functions in the form of object modules which are objective entities to be handled by the operating system. Thus, the parallel objects are the units to be handled or processed. For instance, scheduling by the operating system is performed on a parallel-object basis. Communication also is executed on the units of parallel objects. In other words, the objects constitute units for operations such as resource management and exclusive execution. The use of such objects enables a programmer to form an object without requiring knowledge of contents of other objects. Thus, the contents of each object can be determined without taking into account factors such as exclusive control.

The described method relying upon the object-oriented technique has the following two major features.

(1) A request from a client to a device driver is sent in the from of a message from the client to the device driver described as a parallel object, as indicated by "request" in FIG. 9. Similarly, an interrupt request is sent, as indicated by "interrupt" in the FIG. 9, in the form of a message from the operating system to the device driver described as a parallel object.

(2) Each device driver runs with a single thread, and the control of the interrupt mask is performed on independent device drivers. Thus, when a device driver is operating, interrupts to be handled by this device driver are not accepted. This relieves the programmers from the burden of considering exclusive control and other controls to cope with an interrupt when they describe each device driver.

By virtue of the two major features set forth above, device drivers described as parallel objects can be formed in the same way as that for application programs. In addition, replacement of device drivers can easily be carried out because the device drivers are implemented outside the operating system. It is also to be appreciated that the stability of operation of the operating system is greatly improved because an error occurring in one device driver does not affect the entire operating system.

Thus, the described problems encountered with the device drivers implemented as part of an operating system in the manner shown in FIG. 8 can be overcome by the technique shown in FIG. 9 in which the device drivers are described as parallel objects similar to application programs.

The technique shown in FIG. 9, however, is still unsatisfactory in that a running device driver does not accept any interrupt. A concept termed as "interrupt mask" is used to express the state of the device driver as to whether or not the device driver accepts an interrupt. For instance, the state of the device driver which rejects an interrupt is expressed as "the interrupt mask is closed". Thus, an expression "interrupt mask is open" means that the device driver is in a state ready to accept the interrupt.

In the technique shown in FIG. 9, the interrupt mask is closed when the device driver is running. Consequently, interrupt latency is prolonged when the processing which is being executed by the device driver includes time-consuming work such as copying of data.

Thus, interrupts cannot be accepted when the device driver is running because each device driver runs with a single thread. Hitherto, the only solution to this problem was to shorten the method of each device driver. It has been therefore difficult to describe a device driver which poses a severe restriction of interrupt latency when describing the device drivers in the form of parallel objects.

SUMMARY OF THE INVENTION

Accordingly, an object of the present invention is to provide a data processing method based on object-oriented device drivers and capable of shortening interrupt latency without impairing the advantage offered by the use of the device drivers.

Another object of the invention is to provide a recording medium storing a program which implements the data processing method.

Still another object of the invention is to provide a data processing apparatus incorporating such a recording medium.

To these ends, according to one aspect of the present invention, there is provided a data processing method in which a device driver for driving a hardware device is described in terms of a multi-thread object capable of allocating a message processing thread and interrupt processing threads to be exclusively used for respective interrupts. The device driver assigns to the message processing thread a processing based on a message received by the device driver from another object thereby executing the processing in the message processing thread. When an event has occurred requesting an interrupt to the device driver, the device driver executes an interrupt processing corresponding to the event in a processing thread corresponding to the event, wherein, in case that the corresponding interrupt processing thread is busy due to execution of another interrupt processing in response to another interrupt when the event has occurred, the interrupt processing corresponding to the event is held without being executed regardless of the state of the message processing thread and is executed only after completion of the interrupt processing which is under execution in the corresponding interrupt processing thread.

For the purpose of achieving synchronization to enable an exclusive control as required in, for example, making access to common data, it is preferred that an order of priorities is set between processing in the message processing thread and processing in the interrupt processing thread. In case that a processing given a higher priority than the interrupt processing is being executed in the message processing thread when an interrupt is received by the device driver, execution of the interrupt processing corresponding to the received interrupt is delayed until the processing in the message processing thread is finished or until the setting of the priority order is changed so as to give higher priority to the interrupt processing than to the processing in the message processing thread. However, in case that the processing given the higher priority than the interrupt processing is not being executed in the message processing thread when the interrupt is received by the device driver, the interrupt processing is executed in the interrupt processing thread without delay after the receipt of the interrupt.

Preferably, an interrupt processing is divided into a plurality of portions having different levels of priority, and a portion of the interrupt processing of a higher priority is executed by being assigned to the interrupt processing thread while a portion of a lower priority is executed by being assigned to the message processing thread. This serves to shorten the time over which the interrupt processing is occupied, thus reducing interrupt latency.

In the data processing method of the invention as set forth above, each device driver is described as a multi-thread object. Therefore, any interrupt can be accepted by the interrupt processing thread even when a processing is under execution by the device driver, provided that such a processing has been assigned to and being executed in the message thread.

In accordance with another aspect of the present invention, there is provided a computer-readable recording medium storing a device driver which is a program for driving a hardware device. The device driver is described in terms of a multi-thread object capable of allocating a message processing thread and interrupt processing threads to be exclusively used for respective interrupt processings. The device driver assigns to the message processing thread a processing based on a message received by the device driver from another object thereby executing the processing in the message processing thread. When an event has occurred requesting an interrupt to the device driver, the device driver executes the interrupt processing corresponding to the event in a processing thread corresponding to the event, wherein, in case that the corresponding interrupt processing thread is busy due to execution of another interrupt processing in response to another interrupt when the event has occurred, the interrupt processing corresponding to the event is held without being executed regardless of the state of the message processing thread and is executed only after completion of the another interrupt processing in the corresponding interrupt processing thread.

Preferably, the device driver is arranged to allow setting of an order of priorities between processing in the message processing thread and processing in the interrupt processing thread. In case that a processing given a higher priority than the interrupt processing is being executed in the message processing thread when an interrupt is received by the device driver, execution of the interrupt processing corresponding to the received interrupt is delayed until the processing in the message processing thread is finished or until the setting of the priority order is changed so as to give higher priority to the interrupt processing than to the processing in the message processing thread, whereas, in case that the processing given the higher priority than the interrupt processing is not being executed in the message processing thread when the interrupt is received by the device driver, the interrupt processing is executed in the interrupt processing thread without delay after the receipt of the interrupt.

The device driver may divide an interrupt processing into a plurality of portions having different levels of priority. In such a case, a portion of the interrupt processing of a higher priority is executed by being assigned to the interrupt processing thread while a portion of a lower priority is executed by being assigned to the message processing thread.

In the recording medium of the invention as set forth above, each device driver is described as a multi-thread object. Therefore, any interrupt can be accepted by the interrupt processing thread even when a processing is under execution by the device driver, provided that such a processing has been assigned to and being executed in the message thread.

In accordance with still another aspect of the present invention, there is provided a data processing apparatus, comprising a recording medium storing a device driver which is a program for driving a hardware device and which is readable by the apparatus from the recording medium. The device driver is described in terms of a multi-thread object capable of allocating a message processing thread and at least one interrupt processing thread. The device driver assigns to the message processing thread a processing based on a message received by the device driver from another object thereby executing the processing in the message processing thread. When an event has occurred requesting an interrupt to the device driver, the device driver executes the interrupt processing corresponding to the event in a processing thread corresponding to the event, wherein, in case that the corresponding processing thread is busy due to execution of another interrupt processing in response to another interrupt when the event has occurred, the interrupt processing corresponding to the event is held without being executed regardless of the state of the message processing thread, and is executed only after completion of the interrupt processing in the corresponding interrupt processing thread.

Preferably, the device driver is arranged to allow setting of an order of priorities between processing in the message processing thread and processing in the interrupt processing thread. In case that a processing given a higher priority than the interrupt processing is being executed in the message processing thread when an interrupt is received by the device driver, execution of the interrupt processing corresponding to the received interrupt is delayed until the processing in the message processing thread is finished or until the setting of the priority order is changed so as to give higher priority to the interrupt processing than to the processing in the message processing thread, whereas, in case that the processing given the higher priority than the interrupt processing is not being executed in the message processing thread when the interrupt is received by the device driver, the interrupt processing is executed in the interrupt processing thread without delay after the receipt of the interrupt.

The device driver may divide an interrupt processing into a plurality of portions having different levels of priority. In such a case, a portion of the interrupt processing of a higher priority is executed by being assigned to the interrupt processing thread while a portion of a lower priority is executed by being assigned to the message processing thread.

In the data processing apparatus of the invention as set forth above, each device driver is described as a multi-thread object. Therefore, any interrupt can be accepted by the interrupt processing thread even when a processing is under execution by the device driver, provided that such a processing has been assigned to and being executed in the message thread.

These and other objects, features and advantages of the present invention will become apparent from the following description of a preferred embodiment.

DESCRIPTION OF THE PREFERRED EMBODIMENTS

A description will now be given of preferred embodiments of the present invention with reference to the drawings.

1. Hardware Environment

Figure 1:
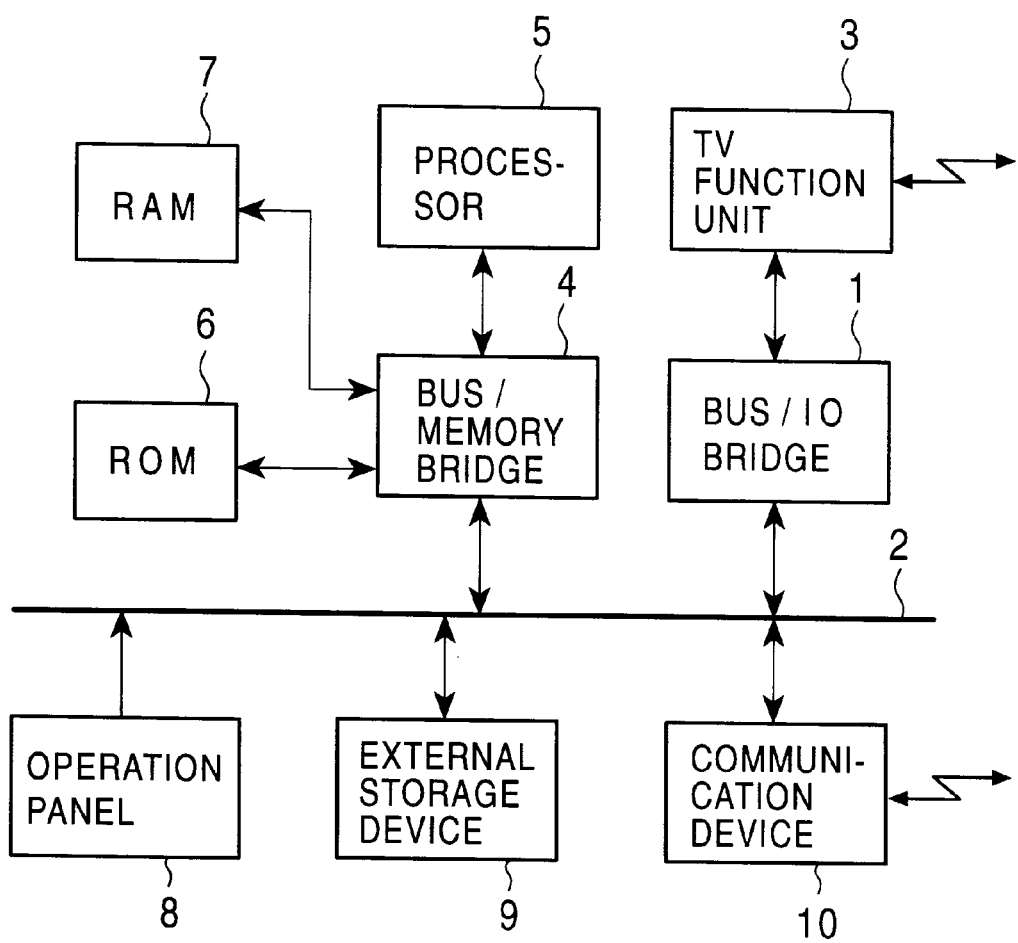
FIG. 1 schematically shows the construction of a TV system incorporating the present invention.

FIG. 1 shows, by way of example, a hardware architecture incorporating the present invention. Although a TV system is specifically mentioned in the following description, it is to be understood that the present invention can also be applied to a variety of types of data processing apparatuses of the kind in which various hardware components are controlled by device drivers. For instance, the present invention can effectively be employed in audio-visual systems, i.e., so-called AV systems, office machines, computers, and so forth, as well as in the television system which will now be described.

Referring to FIG. 1, the TV system as an embodiment of the data processing apparatus of the invention receives signals from a station via air (antenna) or through a cable, and displays an image based on the received signal on a CRT or a liquid crystal display device while outputting acoustic signals from a speaker.

This TV system has, besides ordinary TV functions, a function for receiving programs and data which are given externally. More specifically, the TV system as shown in FIG. 1 has a TV function unit 3 connected to a BUS 2 through a BUS/IO bridge 1, a processor 5 connected to the BUS 2 through a BUS/MEMORY bridge 4, a ROM (Read Only Memory) 6 and a RAM (Random Access Memory) 7 which also are connected to the processor 5 through the BUS/MEMORY bridge 4, an operation panel 8 connected to the BUS 2, and an external storage device 9 and a communication device 10 which are also connected to the BUS 2.

The TV function unit 3 has a function for generating images and voices based on signals received via air or a cable, and is connected to the BUS 2 through the BUS/IO bridge 1 for communication with other devices of the system.

The processor 5 controls operations of various devices constituting the TV system. To this end, the processor 5 is connected to the BUS 2 via the BUS/MEMORY bridge 4. To the processor 5 are also connected the ROM 6 and the RAM 7 via the BUS/MEMORY bridge 4.

The ROM 6 stores an operating system, device drivers and application programs which implement the controls to be performed by the processor 5. In this embodiment, the operating system is an object-oriented operating system. The device drivers and the application programs operate as parallel objects.

The RAM 7 is used as a work area for the processor 5. Thus, the processor 5 uses the RAM 7 as the work area when executing the operating system, device drivers and the application programs, thereby controlling the operations of various devices constituting the TV system.

The operation panel 8 serves as an input device which receives operational instructions input by the user, such as instructions for channel change-over or volume control. Practically, the operation panel 8 has an input device such as a console having a plurality of buttons, a pointing device such as a mouse, and so on. Signals input through the operation panel 8 are delivered to the processor 5 via the BUS 2 and the BUS/MEMORY bridge 4. Based on the signals input through the operation panel 8, the processor 5 performs various computations to control the component devices.

The external storage device 9, which may be a hard disk device, stores image data, control data and application programs down-loaded from an external system via the communication device 10. Thus, the communication device 10 serves as an I/O unit which undertakes signal exchanges with the external system, and comprises, for example, a MODEM or a terminal adapter.

The TV system not only performs ordinary TV functions provided by the TV function unit 3 but also has various other functions. For instance, the TV system can receive programs and data received from external systems via the communication device 10. This function enables updating of versions of the operating system and the device drivers simply by receiving new software modules from an external network via the communication device 10.

This TV system executes, under the control of the processor 5, the operating system and the device drivers stored in the ROM 6, and allows application programs stored in the ROM 6 or the external storage device 9 to be executed on the operating system, thereby controlling the component devices. Thus, the ROM 6 is used as a computer-readable storage medium which stores the operating system and the device drivers. The operating system and the device drivers, however, may be stored in the RAM 7 or in the external storage device 9. Storage in the RAM 7 or the external storage device 9 is preferred when rewriting of the operating system and device drivers is necessary.

2. Software Environment

A description will now be made as to the software environment of the TV system.

2-1 Operating System

The operating system used in this TV system is of the type known as an "object-oriented" operating system. Various application programs are executed on this operating system. These application programs include, for example, an application program for enabling the TV function unit 3 to display moving pictures, and an application program which implements a graphical user interface (GUI) for enabling the user to control the system through the operation panel 8.

This operating system can simultaneously provide execution environments for a plurality of programs. In the following description, each program execution environment will be referred to as a "meta-space". More specifically, the following three types of meta-space are provided by the operating system: a meta-space for executing the device driver (this meta-space will be referred to as "mDrive meta-space", hereinafter), a meta-space for enabling execution of a procedural application program such as an application program for enabling the TV function unit 3 to display moving pictures, and a meta-space for executing an object-oriented application program for implementing, for example, the GUI which enables the user to interact with the system.

In order to deal with interrupts, the mDrive meta-space provides a function for implementing various means such as means for registering an interrupt handler which is an interrupt handling object, means for invoking the handler in response to an interrupt, and means for controlling an interrupt mask. The mDrive meta-space also provides a basic message communication function and memory managing function which enable the device drivers to operate as parallel objects.

Each device driver operates in accordance with the function provided through an API (Application Program Interface) of the mDrive meta-space. Thus, when one of the device drivers is executed to implement a control in such a manner as to interfere with the operation of another device driver, e.g., control of an interrupt mask, the control is necessarily conducted via the API of the operating system, while direct mutual control between these device drivers is prohibited. This eliminates any risk of malfunction attributable to direct mutual control between the device drivers, thus ensuring stable operation of the device drivers.

The feature that the control of each device driver is conducted necessarily through the API of the operating system enables each device driver to operate as an independent module. It is therefore possible to dynamically alter each device driver without substantial difficulty. This permits an easy dynamic updating of each device driver, simply by down-loading a program module through a network.

2-2 Basic Execution Model of Device Driver

A description will now be given of a basic execution model of the device driver which is executable on the above-described operating system.

Figure 2:
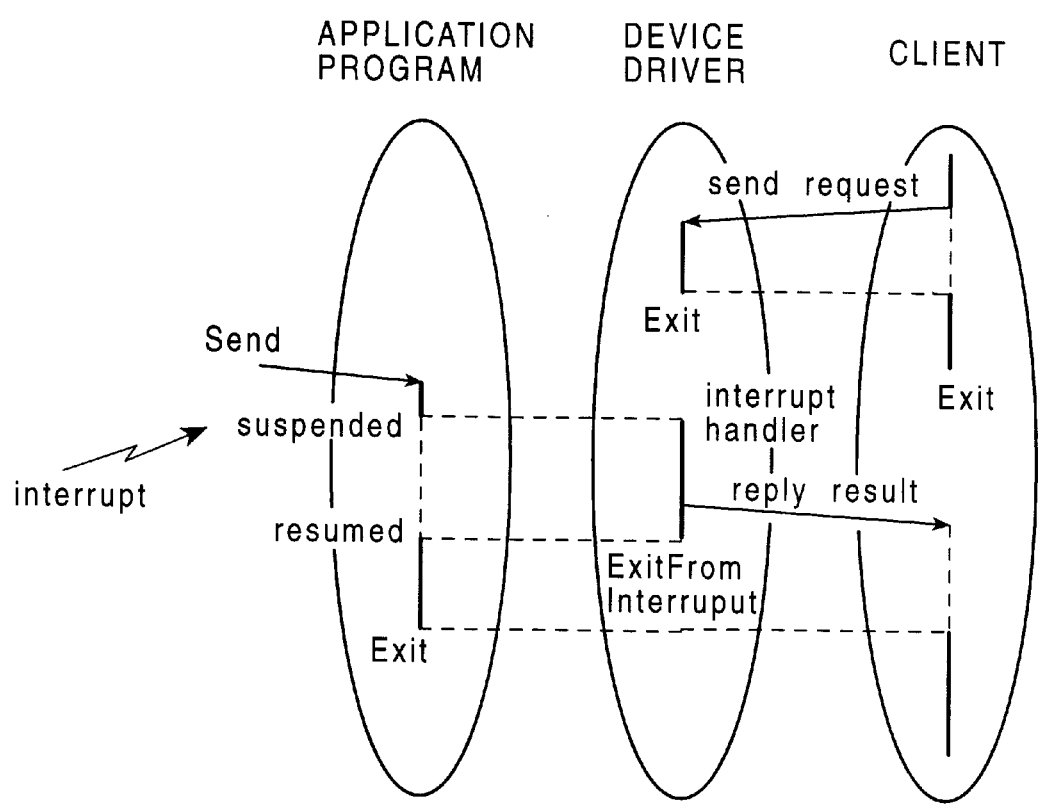
FIG. 2 shows a device driver execution model.

FIG. 2 shows, by way of example, a basic execution model of the device driver. The device driver is triggered by a message from a client, controls the hardware in accordance with the message, and terminates its operation upon completion of the control of the hardware. In this case, an application program that uses the device driver functions as the client. In the following description, the processing conducted by the device driver based on the message from the client will be referred to as "message processing".

In the event that an interrupt request is given to the device driver from the hardware, the device driver performs interrupt processing in accordance with the interrupt request.

More specifically, when an event has occurred to request an interrupt to the device driver, the device driver interrupts a thread of another application program under execution, if any. Then, the interrupt handler is triggered to execute the interrupt processing, while performing message exchange with the client as required. The thread of the application program that has been interrupted is then resumed or, depending on the kind of the interrupt, a client's method is triggered, when the interrupt processing performed by the interrupt handler is finished.

The interrupt handler is dynamically registered for each device driver when an initializing method is executed on the device driver. When an event has occurred that requests an interrupt to the device driver, a message requesting the interrupt is sent to the interrupt handler as a specific asynchronous message. Upon receipt of the request, the interrupt handler is triggered to execute the interrupt processing as described. The method of the interrupt handler is described as a method which is triggerable by message communication, as in the case of methods of other objects. When an interrupt handler is dynamically registered for each driver through the execution of the initializing method on each device driver, information concerning the message for each interrupt handler is registered in the mDrive meta-space.

2-3 Interrupt Mask of Device Driver

The interrupt processing employs an interrupt mask of the device driver. The interrupt mask is controlled in the following manner. The description will proceed based on the following scenario. A message "RequestA" is input to a device driver from an object which functions as the client for the device driver. This object will be referred to as a "client object", hereinafter. Upon receipt of the message "RequestA", the device driver executes a predetermined message processing (referred to as "message processing A", hereinafter) for controlling the hardware, in accordance with the message "RequestA".

(2) When the processing conducted by the device driver is completed, the device driver releases the thread in which the message processing A has been executed, regardless of the progress of the processing performed by the hardware. In this state, the device driver delays replying to the message "RequestA" until an interrupt indicating completion of the processing performed by the hardware is received from the hardware.

(3) Then, a message "RequestB" is input to the device driver from another object (referred to as an "object B") which also functions as a client to the device driver. Upon receipt of the message "RequestB" the device driver executes a predetermined message processing (referred to as "message processing B", hereinafter) for controlling the hardware, in accordance with the message "RequestB".

(4) It is assumed here that the processing that has been under execution by the hardware in accordance with the message "RequestA" is completed during the execution of the message processing B. This situation is an event that requests an interrupt to the device driver. Therefore, an "interruption message" is input from the hardware to the device driver via the operating system requesting execution of a predetermined interrupt processing which is bound to be executed in response to completion of the processing by the hardware.

(5) The device driver operates the interrupt handler to execute the predetermined interrupt processing in accordance with the received interrupt message and, upon completion of the interrupt processing, sends the pending reply to the message "RequestA" to the client object A.

The term "interrupt latency" is used in this specification to mean the length of time from the occurrence of an interrupt to the triggering of the interrupt handler responding to the interrupt. The present invention effectively shortens the interrupt latency. The interrupt processing cannot be executed when the device driver is in a condition which rejects any interrupt request, i.e., when the interrupt mask is closed. In general, therefore, the maximum interrupt latency coincides with the maximum masking period in which the mask is kept closed.

2-3-1 Interrupt Mask Under Known Art

Before turning to the description of the preferred embodiment, a description will be given as to the manner in which an interrupt mask is controlled in a known device driver.

Figure 3:
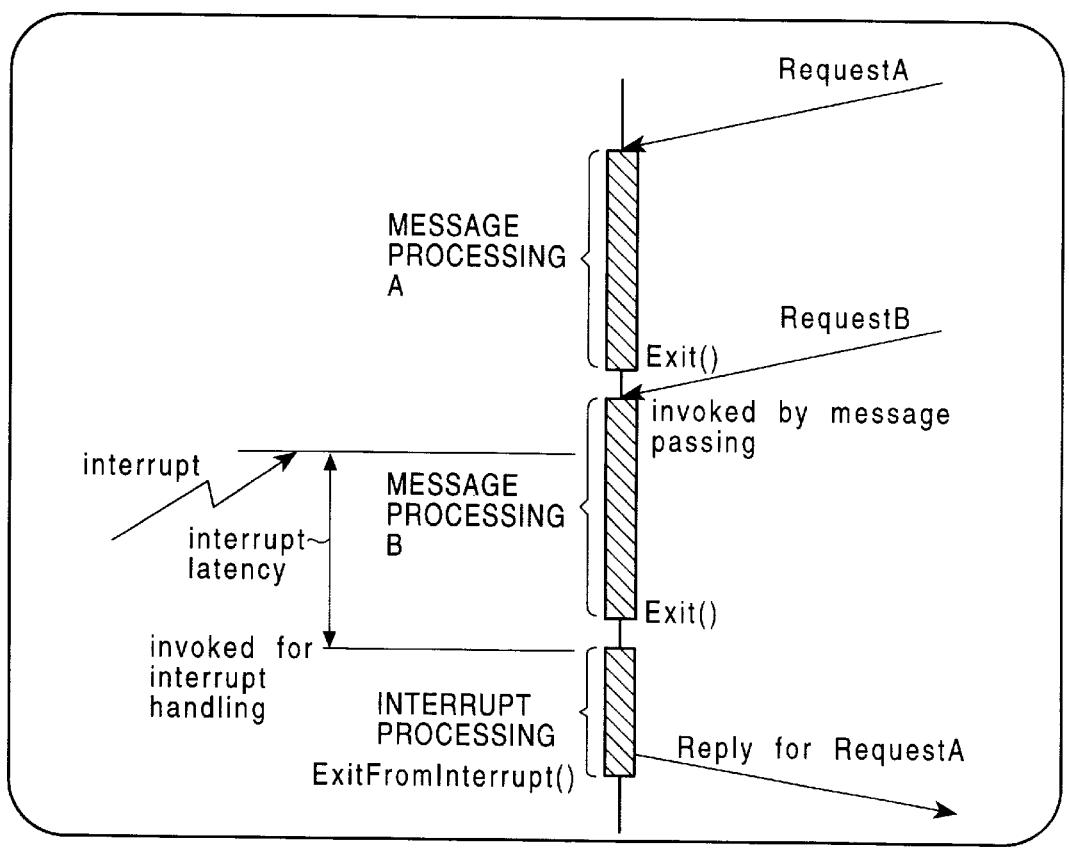
FIG. 3 shows, by way of example, an operation for controlling an interrupt mask of a device driver in accordance with a known method under a type 1 programming style.

FIG. 3 illustrates, by way of example, an interrupt mask control executed in a known art in which the device driver is described as a parallel object. The device driver is described as a single-thread object. Control of the interrupt mask is performed by the operating system through switching of the thread, i.e., by context switching.

More specifically, the interrupt mask is "open" when the device driver has not been started, i.e., when the thread of the device driver is empty. Conversely, the interrupt mask is "closed" when the device driver has been started so that the thread of the device driver is active.

In other words, in the conventional device driver, the interrupt mask is in the closed state not only when an interrupt processing is being executed in response to an interrupt from the hardware but also when message processing in response to a message from another object, e.g., the message processing A or the message processing B in the above-described scenario.

Thus, as will be seen from FIG. 3, the interrupt which was triggered during execution of the message processing B is held, without being executed, until the message processing B is completed. The interrupt handler is started to execute the interrupt processing corresponding to the interrupt message only after the completion of the message processing B.

In the conventional device driver, the interrupt mask is kept closed when a message processing is being executed in response to a message from another object. This naturally leads to prolongation of the interrupt latency. This problem is serious particularly when the message processing which is being executed takes a long time. In such a case, the interrupt latency is unduly extended so as to hamper the expected control of the hardware which poses a very severe restriction in regard to interrupt latency, resulting in an interrupt failure. Thus, the conventional device driver inherently has a risk that it may fail to correctly control the hardware due to excessive prolongation of the interrupt latency.

The only relief to this problem in the conventional device driver is to minimize the size of description of each method contained in the device driver or to separate as much as possible any portion that is not essential for the hardware control from the device driver itself. Consequently, there is a practical limit in the shortening of the interrupt latency in the conventional device driver.

In the following description, the programming style in which the device driver is described as a single-thread object, as in the above-described example, will be referred to as "type 1".

2-3-2 Interrupt Mask in Accordance with the Invention (Version 1)

A description will now be given of an embodiment of the present invention. In this embodiment, a device driver is described as a multi-thread object. This programming style will be referred to as "type 2" in the following description.

Figure 4:
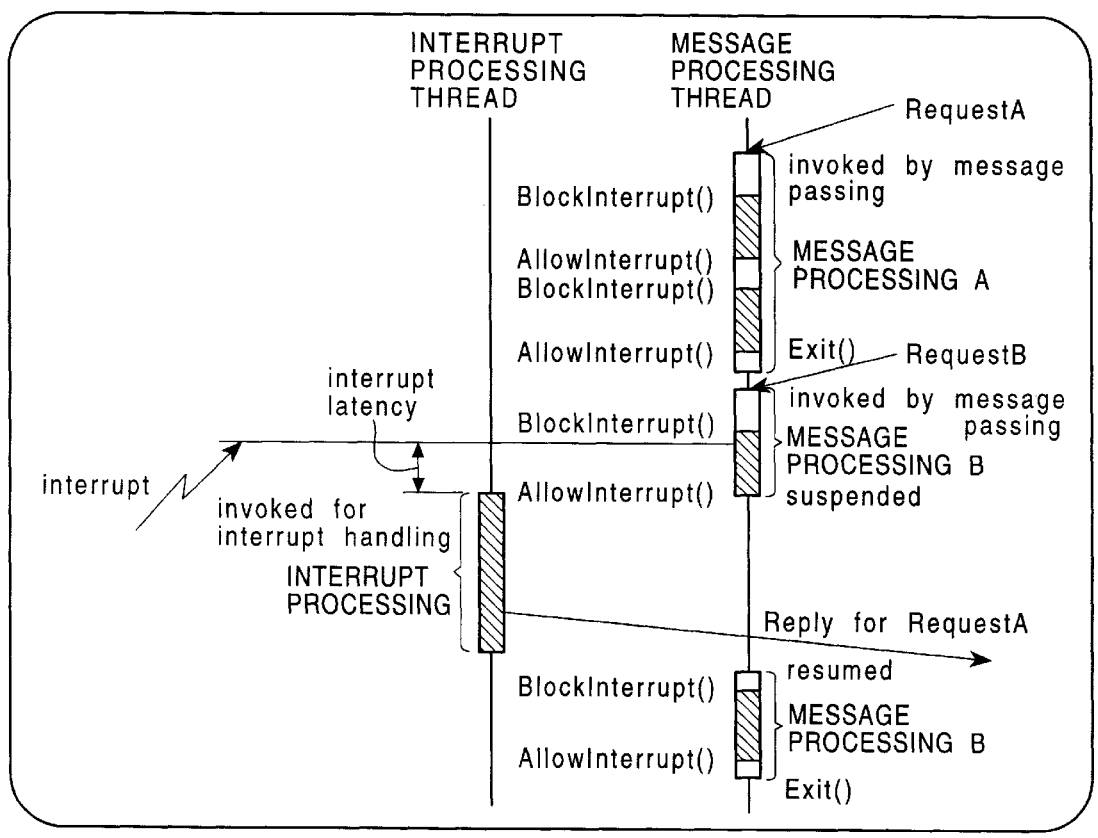
FIG. 4 shows, by way of example, an operation for controlling an interrupt mask of a device driver in accordance with the present invention under a type 2 programming style.

FIG. 4 shows an execution model which follows the scenario described before, in particular an interrupt mask control performed in this embodiment. As will be seen from FIG. 4, the device driver is described as a multi-thread object. More specifically, a message processing thread and an interrupt processing thread are allocated to the device driver.

The interrupt processing thread is a thread which executes interrupt processing. When an interrupt handler is registered, the interrupt processing thread is allocated as a thread which is to be used exclusively for the newly registered interrupt handler. The other thread, i.e., the message processing thread, is intended to execute message processing. Only one message processing thread is allocated to each device driver. Thus, the illustrated embodiment employs different threads for the interrupt processing and the message processing.

The interrupt mask is closed only when the interrupt handler is operating. It is assumed here that an event has occurred which requests an interrupt to the device driver. This request is held without being accepted if the interrupt processing thread of the device driver is busy due to execution of an interrupt processing responding to another interrupt request. Thus, the interrupt is held without being executed until the interrupt processing thread becomes vacant. However, when the interrupt processing thread is not busy, i.e., when it is not executing any previous interrupt processing, the interrupt request is accepted by the device driver.

This permits acceptance of an interrupt even when message processing is being executed in the message processing thread, thus offering shorter interrupt latency. Thus, the illustrated embodiment effectively shortens the interrupt latency without impairing the advantage which is brought about when the device driver is described as a parallel object.

When an interrupt has occurred requesting control of the hardware while message processing is being executed, it is necessary to achieve synchronization between the message processing and the interrupt processing, since the interrupt handler is not allowed to operate when the message processing is being executed. In other words, it is necessary to execute an exclusive control in order that the interrupt processing by the interrupt handler is correctly performed even when the interrupt has occurred during the execution of message processing.

In accordance with the present invention, therefore, an exclusive control is performed in such a manner that a message processing thread controls the state of the interrupt mask by means of a predetermined API (Application Program Interface) so as to suppress starting of the interrupt handler in a period covering the period necessitating such an exclusive control, thereby ensuring that the interrupt processing by the interrupt handler is executed without fail.

It is to be noted that the interrupt masks controlled through the API implementing such an exclusive control are used only for the interrupts which are to be handled by the independent device drivers. Therefore, control of the interrupt mask of a certain device driver does not disturb operations of other device drivers.

A detailed description will now be given of the execution model of the type 2 programming style, with specific reference to FIG. 4.

Referring to FIG. 4, a method "BlockInterrupt( )" and a method "AllowInterrupt( )" have been provided as predetermined APIs by the mDrive meta-spaces. The method "BlockInterrupt( )" controls an interrupt mask such that, even when an interrupt has occurred during message processing, the message processing is executed preferentially while blocking the interrupt, whereas the method "AllowInterrupt( )" sets up such a procedure that allows an interrupt to be executed preferentially while suspending the message processing when the interrupt has occurred during the execution of message processing.

Referring further to FIG. 4, a message "RequestA" is input to the device driver so that a message processing A is started in response to the message "RequestA" (invoked by message passing). The message processing A is executed with the message processing thread. In this message processing A, each period, shown by hatching, between a moment at which the method "BlockInterrupt( )" is called and a moment at which the method "AllowInterrupt( )" is called, permits the message processing to be preferentially performed while the interrupt is blocked. Therefore, any interrupt received during this period is held without being executed.

The device driver, upon completion of the processing to be executed by the device driver, executes a method "Exit( )" thereby opening the message processing thread, regardless of the state or progress of the processing performed by the hardware. The device driver delays replying to the message "RequestA" until an interrupt indicating completion of the processing on the hardware is received from the hardware.

Then, another message "RequestB" is input to the device driver, so that a message processing B is started in response to the message "RequestB" (invoked by message passing). The message processing B is executed with the message processing thread. In this message processing B too, each hatched period, between a moment at which the method "BlockInterrupt( )" is called and a moment at which the method "AllowInterrupt( )" is called, is the period that permits the message processing to be preferentially performed while the interrupt is blocked. Therefore, any interrupt received during this period is held without being executed.

It is assumed here that the processing which has been under execution by the hardware in response to the message "RequestA" is completed while the message processing B is being executed. This is an event that requests an interrupt to the device driver. Thus, an interrupt message "Interrupt" is input from the hardware to the device driver through the operating system requesting execution of a predetermined interrupt processing that follows the completion of the processing by the hardware.

Referring to FIG. 4, however, the moment of occurrence of this interrupt falls within the period between the moment of calling the method "BlockInterrupt( )" in response to the message "RequestB" and the moment of calling the method "AllowInterrupt( )". Therefore, the message "Interrupt" is held without being executed. Thus, the procedure which gives priority to the message processing performed by the message processing than to the interruption processing is valid when the interrupt is received by the device driver, so that the interrupt processing is held waiting for execution.

Subsequently, the method "AllowInterrupt( )" is called, so that the message processing B is suspended. Thus, a context switching is performed from the message processing thread to the interrupt processing thread, whereby the interrupt processing is started in response to the interrupt message "Interrupt" (Invoked for interrupt handling). The interrupt processing is executed with the interrupt processing thread. Thus, the interrupt latency in this embodiment corresponds to the period between the moment at which the interrupt has occurred and the moment at which the method "AllowInterrupt( )" is called during the processing B so as to allow the interrupt. The interrupt is then executed after expiration of this period of interrupt latency.

Thus, the device driver enables the interrupt handler to execute a predetermined interrupt responding to the interrupt message "Interrupt", and sends a reply (Reply for RequestA) to the message "RequestA" indicating the completion of execution of the interrupt processing. When the interrupt processing is finished, a method "ExitFromInterrupt( )" is executed to open the interrupt processing thread. As a result, a context switch is performed from the interrupt processing thread to the message processing thread, whereby the message processing B which has been suspended is restarted (resumed). When the message processing B is finished, a method "Exit( )" is executed so as to open the message processing thread.

Thus, in the example shown in FIG. 4, a period exists in which the interrupt mask is open even when the message processing B is being executed. The message processing B is suspended when the interrupt mask is opened, so as to allow the interrupt to be executed. Thus, the illustrated embodiment enables the interrupt mask to be opened and closed in each period of message processing, by calling the method "BlockInterrupt( )" and the message "AllowInterrupt( )" during such a period. Namely, the interrupt handler is started to execute the interruption immediately after the method "AllowInterrupt( )" is invoked, even during execution of message processing.

In this embodiment, therefore, an interrupt can be executed in response to an interrupt request without being held unexecuted until the end of the message processing, thus minimizing the interrupt latency. In addition, no specific consideration is necessary as to synchronization of the message processing with any processing other than the interrupt processing because the message processing is executed with a single thread. This greatly facilitate the programming work.

As has been fully described, in accordance with the type 2 programming, an interrupt processing thread is allocated as a thread which is used exclusively for the interrupt handler when the latter is registered. The arrangement is such that the period over which the interrupt mask is closed coincides with the period over which the interrupt processing thread runs. In other words, an interrupt is accepted whenever the interrupt processing thread is not working, even when the message processing thread is working, so that the interrupt latency can be shortened.

It is also to be understood that the programming employed in this embodiment is not a mere multi-thread programming. Namely, the multi-thread programming employed in this embodiment is a specific one in which the message processing is executed by a single message processing thread alone. Therefore, the advantages which are brought about when the device drivers are described as parallel objects are maintained without being impaired.

The type 2 programming needs the exclusive control during the message processing only for the purpose of dealing with an interrupt conducted by the interrupt handler using the interrupt thread. Therefore, in this embodiment, the portion which undertakes the exclusive control closes itself in each device driver. In other words, the exclusive control which is conducted in each device driver for the purpose of achieving synchronization between the message processing and the interrupt processing does not affect the operation of other device drivers. This offers advantages such as implementation of a system that permits easy dynamic changes of device drivers. For instance, a system can be obtained in which a device driver can dynamically be changed by down-loading a program module through a network.

2-3-3 Interrupt Mask in Accordance with the Invention (Version 2)

Another embodiment of the present invention will now be described. This embodiment employs a programming style in which device drivers are described in the form of multi-thread objects and a message processing thread also is employed in an interrupt processing. This programming style will be referred to as "Type 3".

Figure 5:
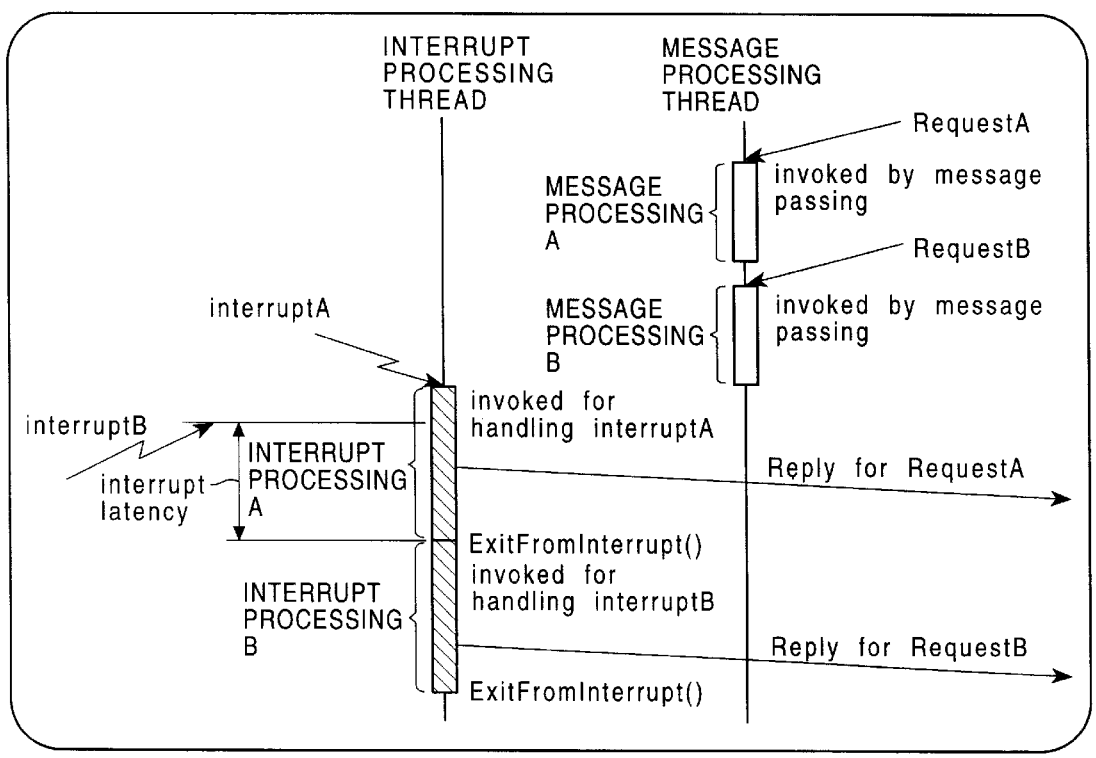
FIG. 5 shows, by way of example, an operation for controlling an interrupt mask of a device driver in accordance with the present invention under the type 2 programming style.

In accordance with the present invention, interrupt processing is executed in an exclusive manner within a single interrupt thread. Therefore, the above-described programming style type 2 poses a problem in that, when consecutive interrupt messages "InterruptA" and "InterruptB" are received as shown in FIG. 5, execution of the interrupt processing corresponding to the later message "InterruptB" is held without being executed until execution of the interrupt processing responding to the earlier message "InterruptA" is finished. The programming style type 3 is intended to obviate this problem thereby further reducing the interrupt latency.

More specifically, in accordance with the type 3 programming style, an interrupt is divided into a plurality of sub-interrupts having different levels of priority. An interrupt processing thread is allocated only for the sub-interrupt of the top priority, and other sub-interrupts of lower levels of priority are assigned to a message processing thread. For instance, the top priority is given to a sub-interrupt that has to be executed without delay for the purpose of controlling the hardware. Sub-interrupts of lower priority levels assigned to the message processing thread are, for example, those which are irrelevant to the control of the hardware, i.e., interrupts which need not be executed right away, such as copying of data into a common memory, reply to a client, and so forth.

A description will now be given of an execution model under the Type 3 programming style, with specific reference to FIG. 6 which assumes the same scenario as that described before.

Figure 6:
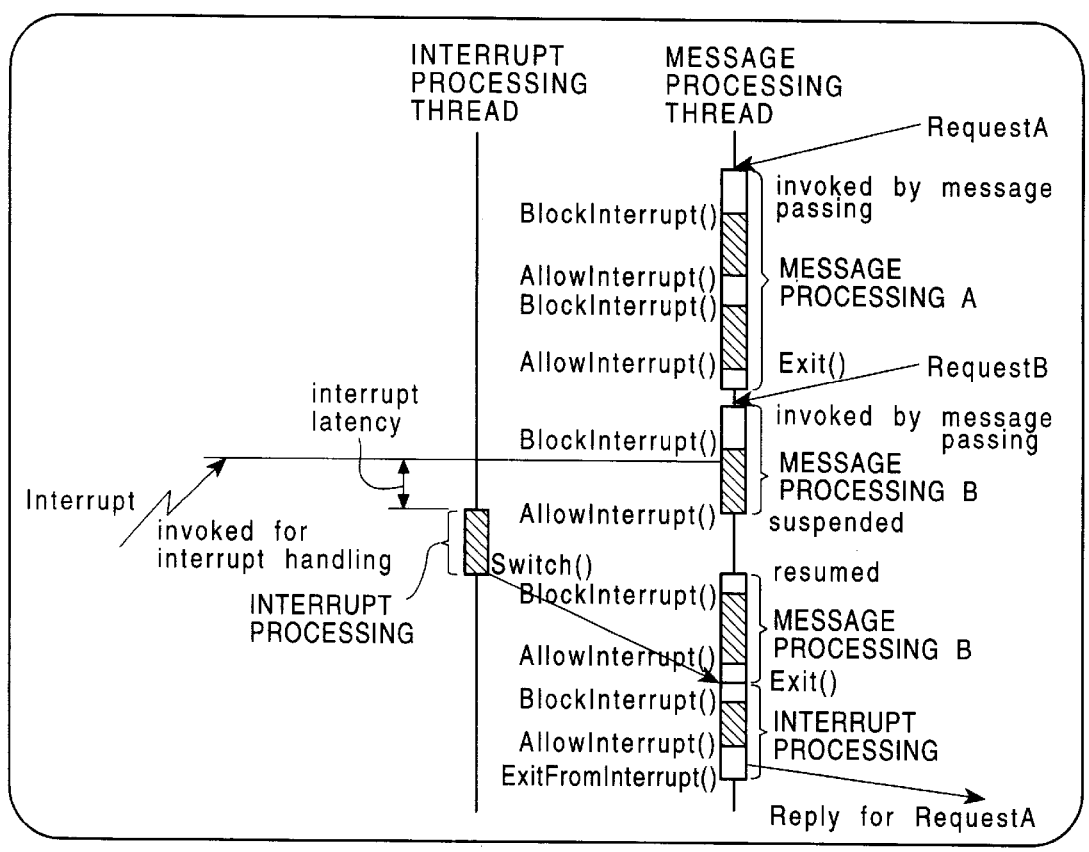
FIG. 6 shows, by way of example, an operation for controlling an interrupt mask of a device driver in accordance with the present invention under a type 3 programming style.

Referring to FIG. 6, a message "RequestA" is input to the device driver, so that a message processing A is started in response to the message "RequestA" (invoked by message passing). The message processing A is executed by using a message processing thread. In the message processing A, a period shown by hatching, from the moment at which a method "BlockInterrupt( )" is called to the moment at which a method "AllowInterrupt( )" is called, is the period in which the message processing is executed with preference to the execution of an interrupt. Any interrupt received during this period, therefore, has to be kept waiting.

When the processing to be executed by the device driver is finished, the device driver executes a method "Exit()", regardless of the status or progress of the processing performed by the hardware, thereby opening the message processing thread. In this state, the device driver delays replying to the message "RequestA" until an interrupt indicating completion of the processing by the hardware is received from the hardware.

Then, a message "RequestB" is input to the device driver, so that a message processing B is started in response to the received message "RequestB" (invoked by message passing). The message processing B is executed by using the message processing thread. In this message processing B too, a period shown by hatching, from the moment at which a method "BlockInterrupt( )" is called to the moment at which a method "AllowInterrupt( )" is called, executes the message processing with preference to the execution of an interrupt. Any interrupt received during this period, therefore, has to be kept waiting.

It is assumed here that the processing which has been under execution by the hardware in response to the message "RequestA" is completed during the execution of the message processing B. This is an event that requests an interrupt to the device driver. Thus, a message "Interrupt", indicating a request for executing a predetermined processing which follows completion of the processing by the hardware, is input from the hardware to the device driver through the operating system.

The moment at which this interrupt has occurred falls within the period between the moment at which the method "BlockInterrupt( )" is called and the moment at which the method "AllowInterrupt( )" is called. Therefore, the interrupt message "Interrupt" is kept waiting without being executed.

When the method "AllowInterrupt( )" is called during the execution of the message processing B, the message processing B is suspended and a context switch is performed from the message processing thread to the interrupt processing thread, whereby the interrupt processing responding to the interrupt message "Interrupt" is started (invoked for interrupt handling). This interrupt processing is executed by means of the interrupt processing thread. Thus, in this embodiment, the interrupt latency corresponds to the period from the moment at which the interrupt has occurred to the moment at which the interrupt processing is enabled by the method "AllowInterrupt( )".

The device driver allows the interrupt handler to execute the predetermined interrupt processing corresponding to the interrupt message "Interrupt". In the illustrated embodiment relying on the type 3 programming style, the interrupt handling enabled to execute the interrupt processing divides the interrupt processing Into a portion, i.e., a sub-interrupt, which needs to be executed without delay and other portions which need not be executed right away. The sub-Interrupt processing which has to be executed without delay Is then executed by means of the Interrupt processing thread, whereas other sub-interrupts which need not be executed right away are assigned to the message processing thread so as to be executed only after the completion of the message processing B, as will be explained later.

When the sub-interrupt processing which needs prompt execution is completed by the interrupt processing thread, a context switch is performed from the interrupt processing thread to the message processing thread, whereby the message processing B which has been suspended is restarted (resumed). When the message processing B is completed, the method "Exit( )" is executed to open the message processing thread.

Thus, the message processing thread is now available for the processing of sub-interrupts which have been held without being executed as being unnecessary to execute right away. These sub-interrupts are therefore executed by means of the message processing thread. As a result of execution of these sub-interrupts, a reply (Reply for RequestA) is sent in response to the message "RequestA", whereby the whole interrupt processing is completed. Then, a method "ExitFromInterrupt( )" is executed to open the message processing thread.

Thus, in accordance with the type 3 programming style, the interrupt processing is divided into a portion which needs a prompt execution and other portion or portions which do not require prompt execution. Only the portion of the processing which needs prompt execution is executed by means of the interrupt processing thread, whereas the other portion or portions of the interrupt processing are executed by means of the message processing thread. It is thus possible to further shorten the period over which the interrupt mask is kept closed.

In the scheme shown in FIG. 6, the length of the interrupt latency is equivalent to that of the case shown in FIG. 4, although the period over which the interrupt mask is closed has been shortened. This is because only one interrupt has occurred during the execution of the message processing B.

Figure 7:
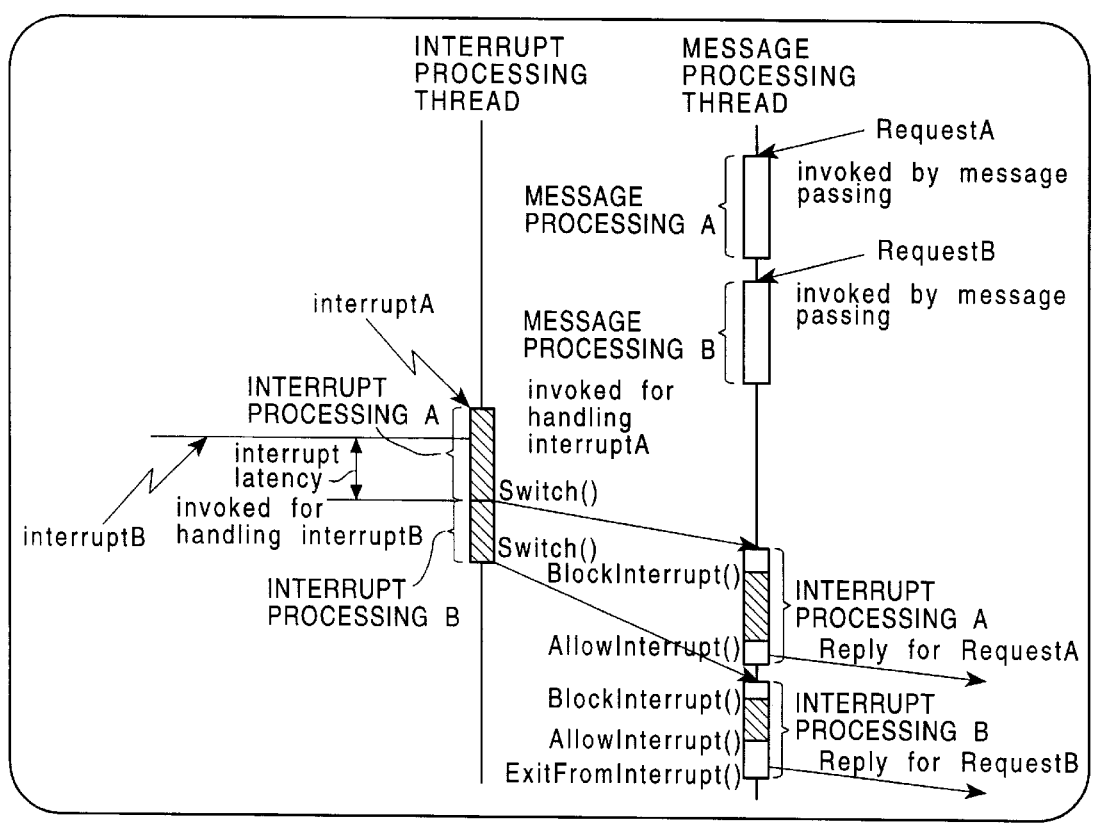
FIG. 7 shows, by way of example, an operation for controlling an interrupt mask of a device driver in accordance with the present invention under the type 3 of programming style.
Figure 8:
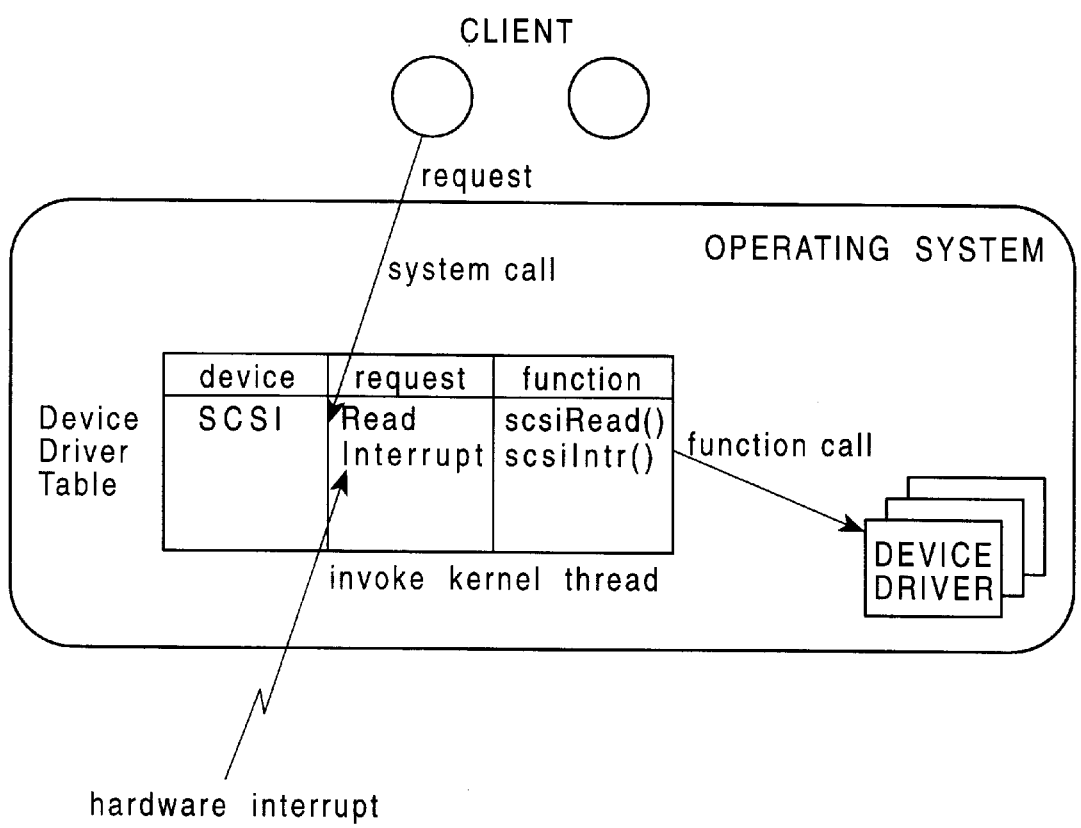
FIG. 8 is an illustration of a conventional device driver programming in which device drivers are implemented as part of an operating system.
Figure 9:
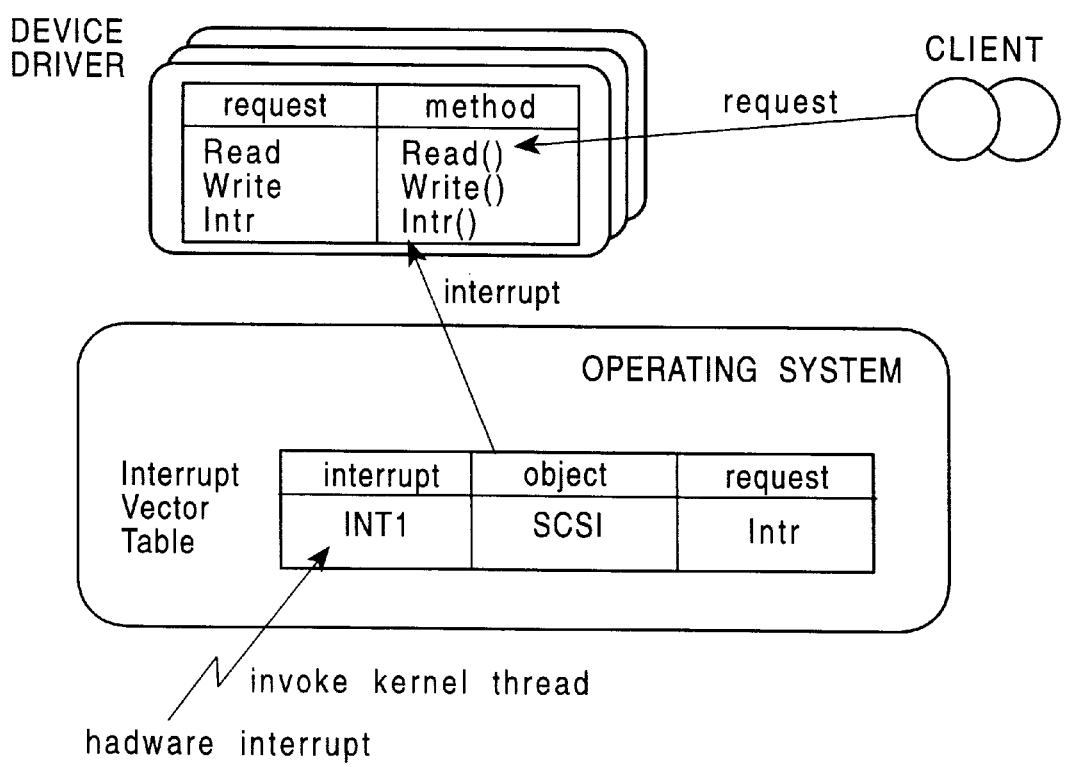
FIG. 9 is an illustration of an object-oriented device driver programming in which device drivers are implemented as parallel objects.

A description will therefore be given as to an example in which the interrupt latency is appreciably shortened by virtue of the Type 3 of programming style, with specific reference to FIG. 7.

Referring to FIG. 7, a message "RequestA" is input to the device driver, and a message processing A is started in response to the message "RequestA" (invoked by message passing). The message processing A is executed by means of the message processing thread. When the processing to be conducted by the device driver is completed, the device driver finishes the message processing A to open the message processing thread, regardless of the status or progress of the processing conducted by the hardware. The device driver delays replying to the message "RequestA" until an interrupt indicating completion of the processing in response to the message "RequestA" is received from the hardware.

Then, another message "RequestB" is input to the device driver, so that a message processing B in response to the message "RequestB" is started (invoked by message passing). The message processing B is executed by means of the message processing thread. When the processing to be conducted by the device driver is completed, the device driver finishes the message processing B thereby opening the message thread, regardless of the status or progress of the processing conducted by the hardware. The device driver delays replying to the message "RequestB" until an interrupt indicating completion of the processing based on the message "RequestB" is received from the hardware.

Then, the processing which has been under execution by the hardware in response to the message "RequestA" is completed. As a result, an interrupt message "InterruptA" is input from the hardware to the device driver via the operating system requesting execution of a predetermined interrupt processing which follows the completion of the processing conducted by the hardware, whereby an interrupt processing A corresponding to the interrupt message "InterruptA" is started (invoked for handling interruptA). The interrupt handler divides the interrupt processing into a sub-interrupt which has to be executed without delay and a sub-interrupt which need not be executed right away. Only the sub-interrupt that needs prompt execution is executed without delay by means of the interrupt processing thread, whereas the sub-interrupt which does not require prompt execution is assigned to the message processing thread.

It is assumed that the processing which has been under execution by the hardware responding to the message "RequestB" is completed so that an interrupt message "InterruptB" requesting an interrupt is input from the hardware to the device driver via the operating system while the sub-interrupt which needs prompt execution is being executed by the interrupt processing thread. At this moment, however, the interrupt is not accepted because the interrupt processing thread is working, so that the interrupt processing B in response to the interrupt message "InterruptB" from the hardware is held without being executed until the interrupt processing thread is opened.

The interrupt processing thread is opened when the processing of the portion, i.e., the sub-interrupt, of the interrupt processing A requiring prompt execution is finished. The interrupt processing B corresponding to the interrupt message "InterruptB" is then started by using the interrupt processing thread which is now open (invoked for handling interruptB).

It is to be understood that the interrupt processing B responding to the interrupt message "InterruptB" is started at the moment when the processing is finished for the portion, i.e., the sub-interrupt, of the interrupt processing A in response to the interrupt message "InterruptA" that requires execution without delay. Thus, the interrupt processing B is started without waiting for the completion of the whole interrupt processing A corresponding to the interrupt message "InterruptA". Therefore, the interrupt latency for the interrupt processing B corresponding to the interrupt message "InterruptB" is short as compared with the case of the type 2 programming style.

The interrupt processing B in response to the interrupt message "InterruptB" also is divided by the interrupt handler into a portion, i.e., a sub-interrupt that has to be executed without delay and an other portion, i.e., an other sub-interrupt, that does not need prompt execution. Only the sub-interrupt that needs prompt execution is executed without delay by means of the interrupt processing thread, whereas the sub-interrupt that need not be executed promptly is assigned to the message processing thread.

A context switch is performed from the interrupt processing thread to the message processing thread when the processing with the interrupt processing thread is completed, i.e., when the portion of the interrupt processing B corresponding to the interrupt message "InterruptB" that needs prompt execution is finished. Then, the portion of the interrupt processing A which has been kept unexecuted as being not urgent is executed by means of the message processing thread. When this processing is finished, the reply to the message "RequestA" which has been held pending is issued (Reply for RequestA). Then, the portion of the interrupt processing B which has been kept unexecuted as being not urgent is executed by means of the message processing thread. When this processing is finished, the reply to the message "RequestB" which has been held pending is issued (Reply for RequestB).

As will be seen from the foregoing description, the type 3 programming style shortens the period over which the interrupt mask is closed, further to that under the type 2 programming style, thus achieving a further reduction in the interrupt latency.

2-4 Operating Environments of Device Drivers

Data processing method and apparatus of the invention have been described based on the types 2 and 3 programming styles, in comparison with the conventional technique which relies upon the type 1 programming style. It is preferred that the operation environments for these three types of programming style have upward compatibility, such that the device driver of the type 1 can operate in the environment of the type 2 and the environment of the type 3 permits device drivers of the types 1 and 2 to operate.

Such an upward compatibility is realized by providing an environment suited to a device driver that requires the greater number of functions than other device drivers. With such an upward compatibility, all the device drivers of different types of programming style in a system can operate without fail.

Device drivers of the type 2 requires a greater number of functions to be provided by the operating system than the device drivers of the type 1 because they are multi-threaded. Similarly, device drivers of the type 3 requires a greater number of functions to be provided by the operating system than the device drivers of the type 2, because under the type 3 an interrupt processing is divided into a portion to be executed in the interrupt processing thread and a portion to be executed in the message processing thread.

Consequently, the operating system required to provide environment suited to the type 2 has to have a greater size than the operating system which provides environment suited to the type 1. Similarly, the operating system required to provide environment suited to the type 3 has to have a greater size than the operating system which provides environment suited to the type 2.

This means that the use of an operating system capable of environment suited to the type 3 is not always preferred, although such an operating system can reduce the interrupt latency. Thus, the selection of the operating system subjects to factors including the degree of demand for reduction in the interrupt latency, as well as required functions, so as to avoid the use of excessively large operating system.

As will be seen from the foregoing description, according to the present invention, it is possible to reduce interrupt latency without impairing advantages brought about by the use of object-oriented device drivers.

Although the invention has been described through its preferred forms, it is to be understood that the described embodiments are only illustrative and various changes and modifications may be imparted thereto without departing from the scope of the present invention which is limited solely by the appended claims.

What is claimed is:

1. A data processing method, comprising:
    describing a device driver for driving a hardware device in terms of a multi-thread object capable of allocating a message processing thread and at least one interrupt processing thread;
    allowing said device driver to assign to said message processing thread a processing based on a message received by said device driver from another object thereby executing said processing in said message processing thread; and
    allowing, when an event has occurred requesting an interrupt to said device driver, said device driver to execute the interrupt processing corresponding to said event in a processing thread corresponding to said event, wherein, in case that said corresponding interrupt processing thread is busy due to execution of another interrupt processing in response to another interrupt when said event has occurred, the interrupt processing corresponding to said event is held without being executed regardless of the state of said message processing thread and is executed only after completion of said another interrupt processing in said corresponding interrupt processing thread.

2. A data processing method according to claim 1, comprising:
    allowing changeably setting an order of priorities between processing in said message processing thread and processing in said interrupt processing thread;
    wherein, in case that a processing given a higher priority than the interrupt processing is being executed in said message processing thread when an interrupt is received by said device driver, execution of the interrupt processing corresponding to the received interrupt is delayed until the processing in said message processing thread is finished or until the setting of the priority order is changed so as to give higher priority to the interrupt processing than to the processing in said message processing thread, whereas, in case that the processing given the higher priority than the interrupt processing is not being executed in said message processing thread when said interrupt is received by said device driver, said interrupt processing is executed in said interrupt processing thread without delay after the receipt of the interrupt.

3. A data processing method according to claim 1, wherein an interrupt processing is divided into a plurality of portions having different levels of priority, and a portion of the interrupt processing of a higher priority is executed by being assigned to said interrupt processing thread while a portion of a lower priority is executed by being assigned to said message processing thread.

4. A data processing method according to claim 1, wherein a plurality of said device drivers are employed, and wherein said device drivers are described as parallel objects that can operate in parallel on an operating system.

5. A computer-readable recording medium storing a device driver which is a program for driving a hardware device,
    wherein said device driver is described in terms of a multi-thread object capable of allocating a message processing thread and at least one interrupt processing thread;
    said device driver assigns to said message processing thread a processing based on a message received by said device driver from another object thereby executing said processing in said message processing thread; and
    wherein, when an event has occurred requesting an interrupt to said device driver, said device driver executes the interrupt processing corresponding to said event in a processing thread corresponding to said event, wherein, in case that said corresponding interrupt processing thread is busy due to execution of another interrupt processing in response to another interrupt when said event has occurred, the interrupt processing corresponding to said event is held without being executed regardless of the state of said message processing thread and is executed only after completion of said another interrupt processing in said corresponding interrupt processing thread.

6. A computer-readable recording medium according to claim 5, wherein said device driver is arranged to allow setting of an order of priorities between processing in said message processing thread and processing in said interrupt processing thread, and wherein, in case that a processing given a higher priority than the interrupt processing is being executed in said message processing thread when an interrupt is received by said device driver, execution of the interrupt processing corresponding to the received interrupt is delayed until the processing in said message processing thread is finished or until the setting of the priority order is changed so as to give higher priority to the interrupt processing than to the processing in said message processing thread, whereas, in case that the processing given the higher priority than the interrupt processing is not being executed in said message processing thread when said interrupt is received by said device driver, said interrupt processing is executed in said interrupt processing thread without delay after the receipt of the interrupt.

7. A computer-readable recording medium according to claim 5, wherein said device driver divides an interrupt processing into a plurality of portions having different levels of priority, and a portion of the interrupt processing of a higher priority is executed by being assigned to said interrupt processing thread while a portion of a lower priority is executed by being assigned to said message processing thread.

8. A computer-readable recording medium according to claim 5, wherein a plurality of said device drivers are employed, and wherein said device drivers are described as parallel objects that can operate in parallel on an operating system.

9. A data processing apparatus, comprising a recording medium storing a device driver which is a program for driving a hardware device and which is readable by said apparatus from said recording medium, wherein said device driver is described in terms of a multi-thread object capable of allocating a message processing thread and at least one interrupt processing thread;

said device driver assigns to said message processing thread a processing based on a message received by said device driver from another object thereby executing said processing in said message processing thread; and wherein, when an event has occurred requesting an interrupt to said device driver, said device driver executes the interrupt processing corresponding to said event in a processing thread corresponding to said event, wherein, in case that said corresponding processing thread is busy due to execution of another interrupt processing in response to another interrupt when said event has occurred, the interrupt processing corresponding to said event is held without being executed regardless of the state of said message processing thread and is executed only after completion of said another interrupt processing in said corresponding interrupt processing thread.

10. A data processing apparatus according to claim 9, wherein said device driver is arranged to allow setting of an order of priorities between processing in said message processing thread and processing in said interrupt processing thread, and wherein, in case that a processing given a higher priority than the interrupt processing is being executed in said message processing thread when an interrupt is received by said device driver, execution of the interrupt processing corresponding to the received interrupt is delayed until the processing in said message processing thread is finished or until the setting of the priority order is changed so as to give higher priority to the interrupt processing than to the processing in said message processing thread, whereas, in case that the processing given the higher priority than the interrupt processing is not being executed in said message processing thread when said interrupt is received by said device driver, said interrupt processing is executed in said interrupt processing thread without delay after the receipt of the interrupt.

11. A data processing apparatus according to claim 9, wherein said device driver divides an interrupt processing into a plurality of portions having different levels of priority, and a portion of the interrupt processing of a higher priority is executed by being assigned to said interrupt processing thread while a portion of a lower priority is executed by being assigned to said message processing thread.

12. A data processing apparatus according to claim 9, wherein a plurality of said device drivers are employed, and wherein said device drivers are described as parallel objects that can operate in parallel on an operating system.

* * * * *